(12) United States Patent
Keirstead

(10) Patent No.: US 6,693,519 B2
(45) Date of Patent: Feb. 17, 2004

(54) VEHICLE SAFETY MONITORING SYSTEM FOR VIEWING BLIND SPOTS

(75) Inventor: Robert Lewis Keirstead, Cherryville, NC (US)

(73) Assignee: V-Tech-USA, LLC, Cherryville, NC (US)

( * ) Notice: Subject to any disclaimer, the term of this patent is extended or adjusted under 35 U.S.C. 154(b) by 117 days.

(21) Appl. No.: 09/870,903

(22) Filed: May 31, 2001

(65) Prior Publication Data

US 2002/0080016 A1 Jun. 27, 2002

(51) Int. Cl.[7] .............................. B60Q 1/00; B60Q 1/22; G09F 9/00; H04N 7/18; H04N 9/47
(52) U.S. Cl. ...................... 340/435; 340/461; 340/463; 348/148; 348/118
(58) Field of Search ................................. 340/435, 436, 340/461, 463, 903; 348/148, 149, 118, 143, 151, 159

(56) References Cited

U.S. PATENT DOCUMENTS

| | | | |
|---|---|---|---|
| 5,027,200 A | | 6/1991 | Petrossian et al. |
| 5,289,321 A | * | 2/1994 | Secor ........................ 359/896 |
| 5,530,421 A | | 6/1996 | Marshall et al. |
| 5,642,238 A | | 6/1997 | Sala |
| 5,680,123 A | * | 10/1997 | Lee .............................. 340/937 |
| 5,793,308 A | | 8/1998 | Rosinski et al. |
| 5,793,420 A | | 8/1998 | Schmidt |
| 5,959,555 A | * | 9/1999 | Furuta ........................ 340/937 |
| 6,100,921 A | | 8/2000 | Rowley |
| 6,115,086 A | * | 9/2000 | Rosen ........................ 348/837 |
| 6,115,651 A | * | 9/2000 | Cruz .............................. 701/1 |
| 6,175,300 B1 | * | 1/2001 | Kendrick .................... 340/436 |

* cited by examiner

Primary Examiner—Jeffrey Hofsass
Assistant Examiner—Lam Pham
(74) Attorney, Agent, or Firm—Summa & Allan, P.A.

(57) ABSTRACT

A vehicle monitoring systems capable of being retrofitted to a commercial transport carrier having a video camera, a fastening bracket for securing the video camera to a first point of attachment on the transport carrier, a ball mount and screw mechanism, a camera support bracket, a monitor support bracket for securing the monitor to a second point of attachment in the cab of the transport carrier, and a coaxial cable for relaying images from the video camera to the monitor, wherein the video camera is adjustably mounted to the first point of attachment and the monitor is adjustable mounted to the second point of attachment. Upon retrofit, the monitoring system provides a rear-view image of areas adjacent the commercial transport carrier (i.e., blind spots), thereby enhancing the driver's situational awareness, preventing highway accidents, and promoting highway safety.

30 Claims, 4 Drawing Sheets

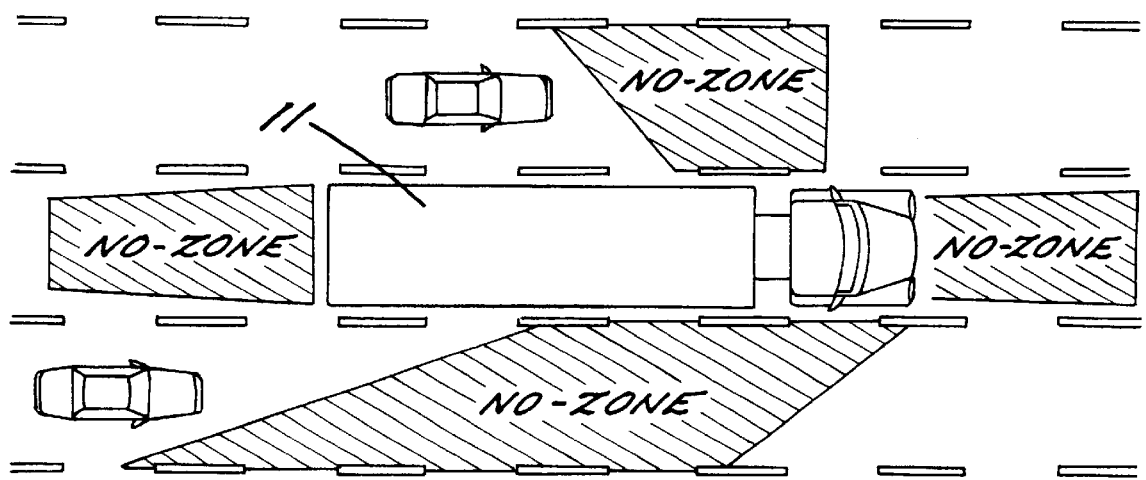
Fig. 1.
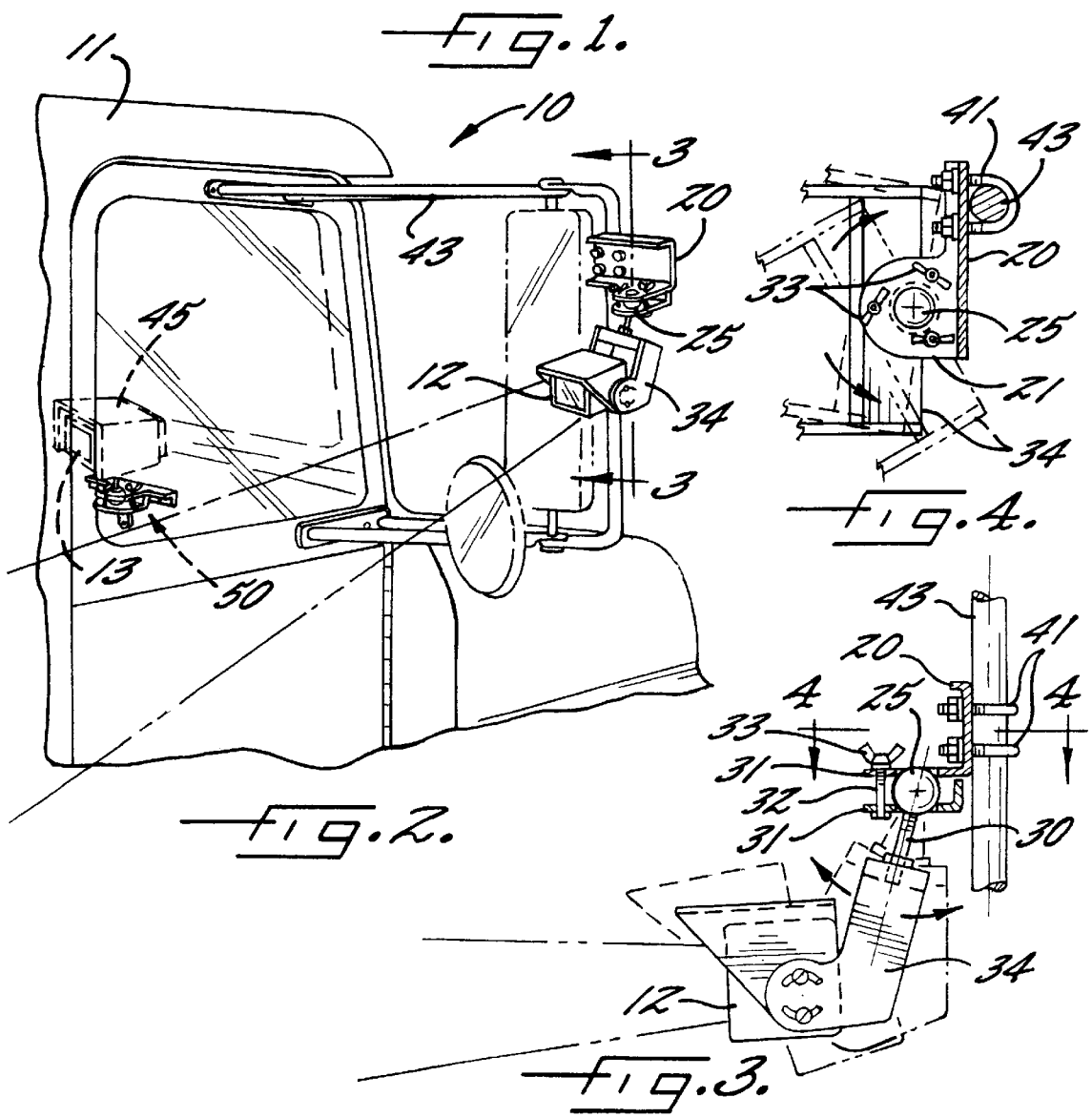
Fig. 2.
Fig. 3.
Fig. 4.

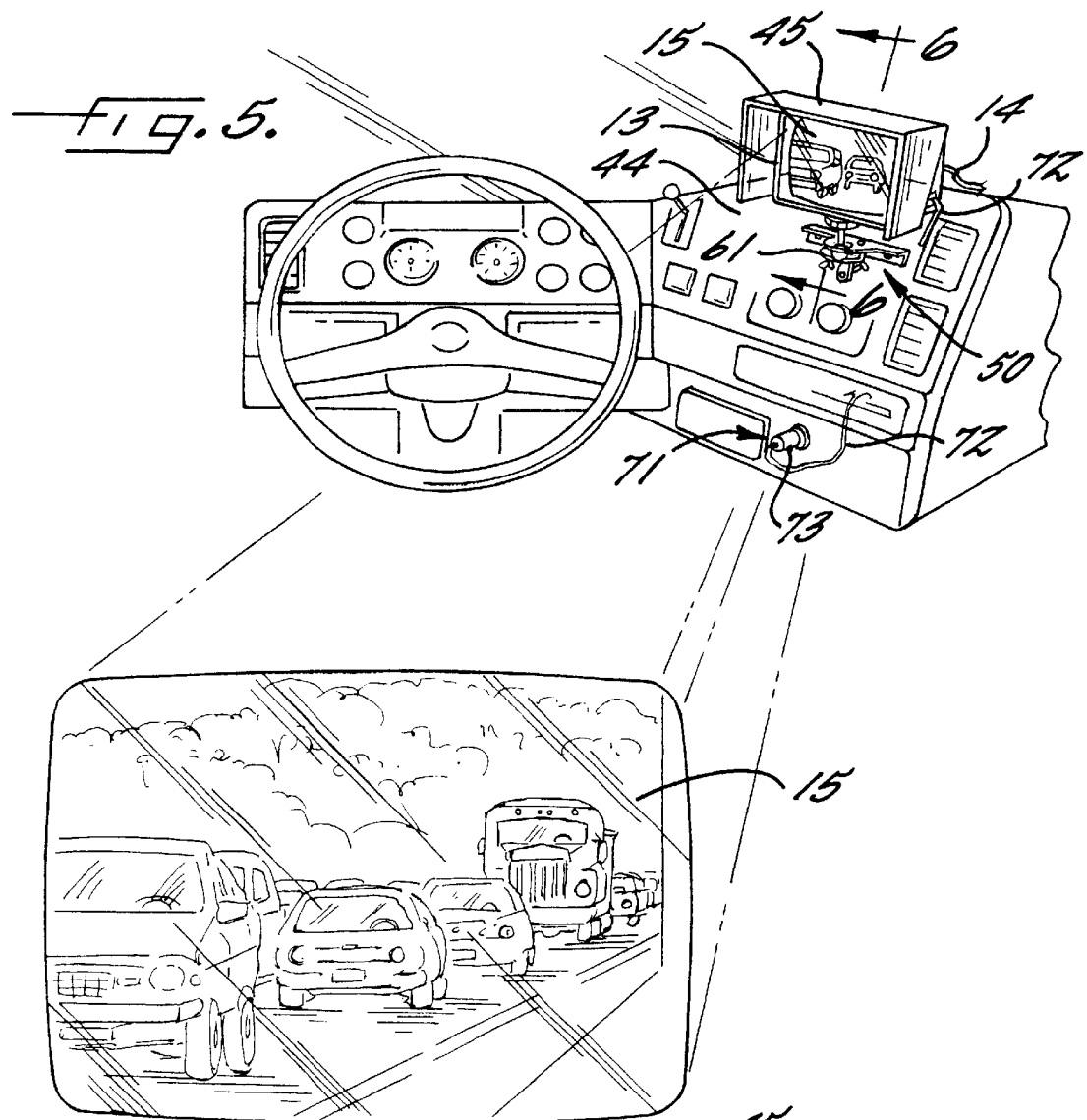
Fig. 5.
Fig. 5A.
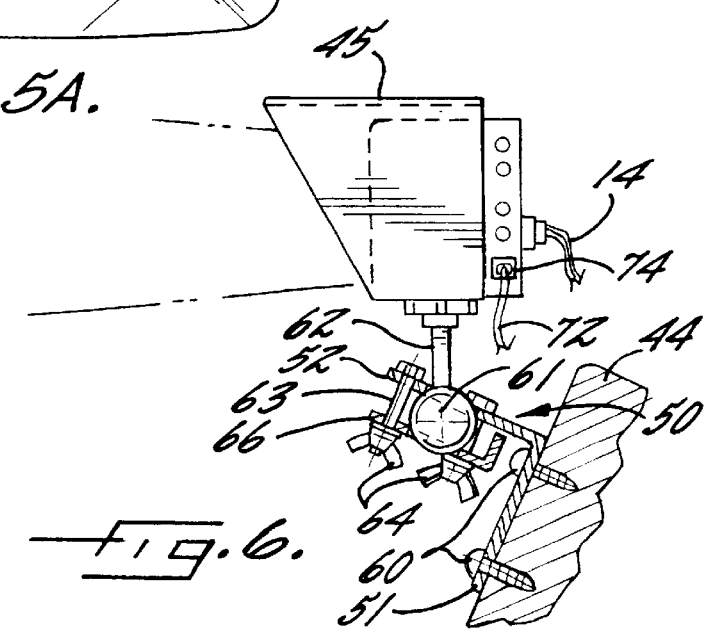
Fig. 6.

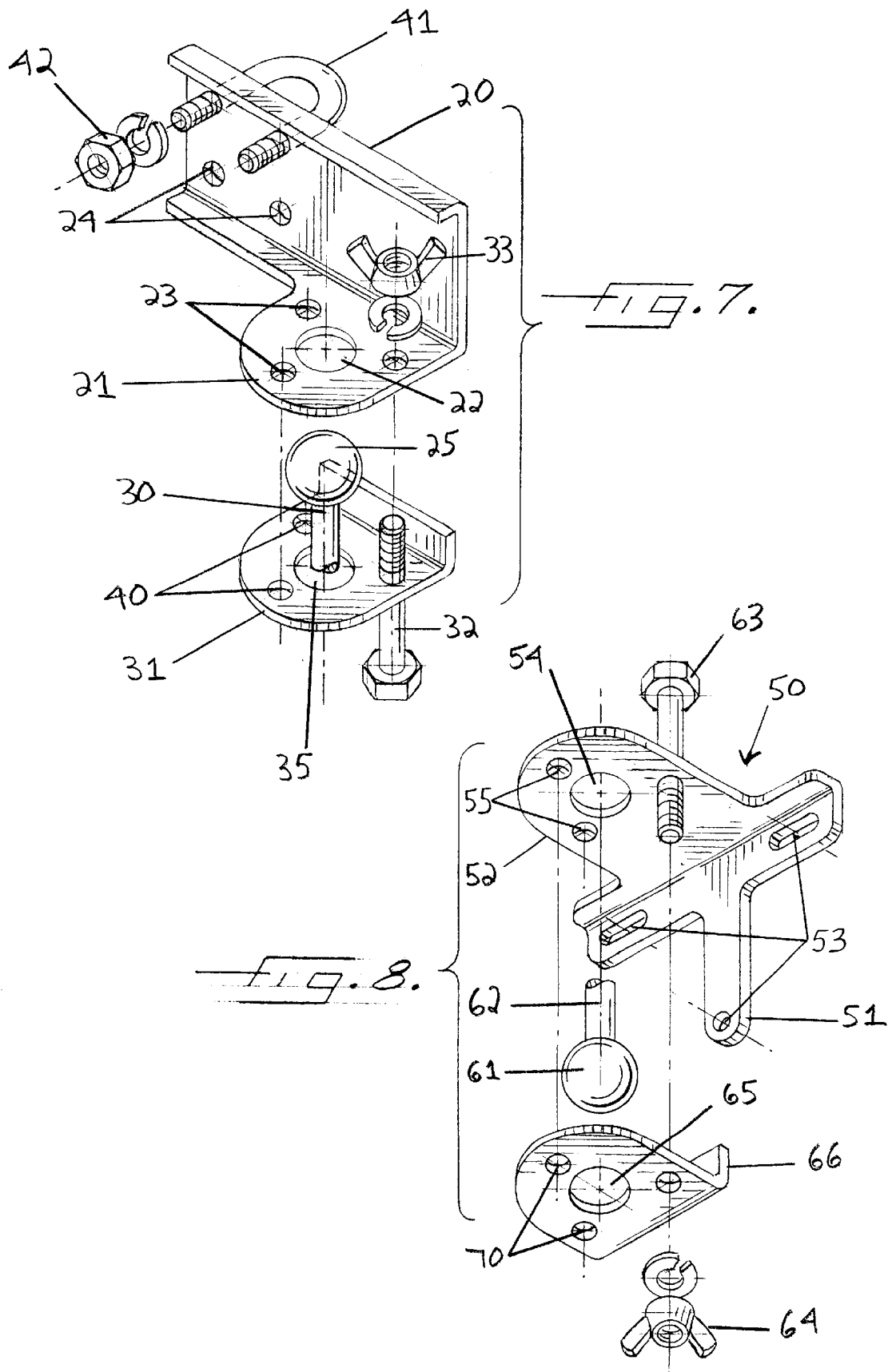

VEHICLE SAFETY MONITORING SYSTEM FOR VIEWING BLIND SPOTS

FIELD OF THE INVENTION

The invention relates to a system for monitoring vehicles on the highway. In particular, the invention relates to a vehicle safety monitoring system that is easily retrofitted to commercial transport carriers and capable of providing a view of areas adjacent the transport carrier commonly referred to as "blind spots."

BACKGROUND OF THE INVENTION

As used herein, the term "commercial transport carrier" will refer to the tractor and trailer combination of vehicle commonly seen on the highways and used to transport commercial goods. Further, the term "tractor" will refer to the cab and engine portion of the vehicle and the term "trailer" will refer to the detachable portion of the vehicle used for hauling goods.

In the United States, there are approximately 1.5 million registered tractors used for hauling trailers containing commercial goods. Studies indicate that there are 250,000 accidents each year involving tractors and/or trailers (or commercial transport carriers). Furthermore, 60% (or 150,000) of all reported accidents involved the right side or "blind spot" of the tractor. The accident rate involving the blind spot of commercial transport carriers has become so alarming that the Federal Motor Carrier Safety Administration launched the "No-Zone Campaign", a public awareness effort to promote safer driving near large commercial transport carriers. No-zones define the blind spots around large trucks that prevent the drivers from seeing other vehicles. Understandably, collisions with commercial transport carriers are most likely to occur in these blind spots.

Several existing monitoring systems provide drivers of commercial transport carriers with a view of the no-zone. For example, one system includes a passive infrared (IR) detector affixed to the right side of the tractor or trailer that provides a warning (audible or visual) to transport carrier drivers when a vehicle is in the no-zone. Nevertheless, the equipment used in this system is expensive and the installation oftentimes requires extensive delays. Furthermore, the equipment utilized in the passive IR system requires frequent maintenance. Thus, existing monitoring systems not only require trucking companies to invest large sums of money to purchase equipment, but also require repeated maintenance. This downtime translates into a shortage of commercial transport carriers available for use in hauling goods.

Less expensive devices for viewing the no-zone include convex mirrors attached to the right side of the tractor. Convex mirrors, however, distort the driver's view, hence the phrase "objects in mirror are closer than they appear" depicted on the face of these mirrors.

U.S. Pat. No. 5,027,200 to Petrossian, et al. describes a remotely operated apparatus housed within the frame of a vehicle for viewing traffic to the rear and sides of the modified vehicle. More specifically, the '200 patent discloses video cameras positioned on both sides of the vehicle, housings for affixing the cameras within the vehicle frame, an actuator for extending and retracting the camera out of and into the housing, and cathode ray tube (CRT) video display terminals mounted in the interior of the vehicle. The actuator promotes horizontal movement of the cameras out of and into the housing. Nevertheless, Petrossian fails to provide an apparatus that can be easily retrofitted to existing vehicles. For example, the apparatus fails to take advantage of existing rear-view mirror mounts (i.e., mirror framework). Rather, the apparatus requires the structural modification of an existing vehicle to provide an internal cavity for housing the cameras. The structural modifications necessary for implementation of the '200 apparatus require that the transport carrier be taken out of service. The downtime delays the transporting of goods and costs the transport provider thousands of dollars. Therefore, the '200 apparatus is impractical for companies owning a large fleet of commercial transport carriers.

In comparison, the present invention does not require an internal cavity for housing the camera and utilizes the standard rear-view mirror framework present on the majority of transport carriers. The ease with which the present invention can be retrofitted provides an economically viable option for owners of large fleets of transport carriers. Simply stated, the present invention is easier to install and maintain (i.e., no structural modification and minimal downtime to retrofit).

U.S. Pat. No. 5,793,308 to Rosinski, et al. discloses a vehicular monitoring system that includes a video display integrated into a rear-view mirror that is capable of displaying various fields of view. Unfortunately, Rosinski requires an elaborate control box (i.e., central processing unit or CPU) for controlling the functions of multiple cameras, mechanical shutters, a recording device, camera scanning functions, and split screen displays. In a preferred embodiment of the '308 patent, the video display is mounted within a side-view mirror located on the exterior of the vehicle. Accordingly, Rosinski fails to disclose an apparatus that can be easily retrofitted to an existing commercial transport carrier without structurally modifying the transport carrier. Further, the elaborate configuration (e.g., CPU, scannable cameras, etc.) likely reduces equipment reliability and requires extensive maintenance.

OBJECT AND SUMMARY OF THE INVENTION

It is therefore an object of the present invention to provide a low-maintenance monitoring system that can be easily retrofitted to existing commercial transport carriers.

Another object of the invention is the provision of a monitoring system that provides visual verification of areas adjacent a commercial transport carrier (i.e., blind spots).

A further object of the invention is to increase the manufacturing efficiencies associated with retrofitting monitoring systems to existing commercial transport carriers.

Yet another object of the invention is to enhance the driver's ability to quickly scan no-zones by viewing a dashboard mounted monitor that provides a rear-view mirror image of blind spots.

The invention meets these objectives with a monitoring system that is easily retrofitted onto existing commercial transport carriers, thereby reducing structural modifications to transport carriers. In particular, the invention is a vehicle monitoring system having a camera mounted on standard rear-view mirror framework, a monitor for providing a rear-view mirror image of adjacent areas that is positioned adjacent the driver, and a conduit for delivering the image from the camera to the monitor.

The foregoing and other objects and advantages of the invention and the manner in which the same are accomplished will become clearer based on the following detailed description taken in conjunction with the accompanying drawings in which:

BRIEF DESCRIPTION OF THE DRAWINGS

FIG. 1 is an overhead view of a commercial transport carrier and surrounding vehicles on an interstate depicting the "no-zones."

FIG. 2 is a partial perspective view of a preferred embodiment of the monitoring system depicting the video camera, camera securing means, and monitor.

FIG. 3 is a cross-sectional view taken generally along lines 3—3 on FIG. 2 depicting the video camera and camera securing means mounted on the rear-view mirror framework, and the path of travel of the camera.

FIG. 4 is a top plan view taken along lines 4—4 of FIG. 3 and depicting the path of travel of the camera.

FIG. 5 is a partial perspective view of the interior of the cab showing the monitor and its positional relationship to the driver.

FIG. 5A is an enlarged view of the monitor depicting the vehicles adjacent the transport carrier in the no-zone, yet viewable by the driver.

FIG. 6 is a cross-sectional view taken along lines 6—6 of FIG. 5 depicting the monitor, monitor securing means, and dashboard.

FIG. 7 is an exploded perspective view of the preferred embodiment of the camera securing means depicting the substantially rectangular fastening bracket, platform, attachment means, ball mount and adjustable screw mechanism, and first ball mount bracket.

FIG. 8 is an exploded perspective view of the preferred embodiment of the monitor securing means depicting the support bracket, attachment means, ball mount and adjustable screw mechanism, and ball mount bracket.

DETAILED DESCRIPTION OF THE INVENTION

Figure 9:
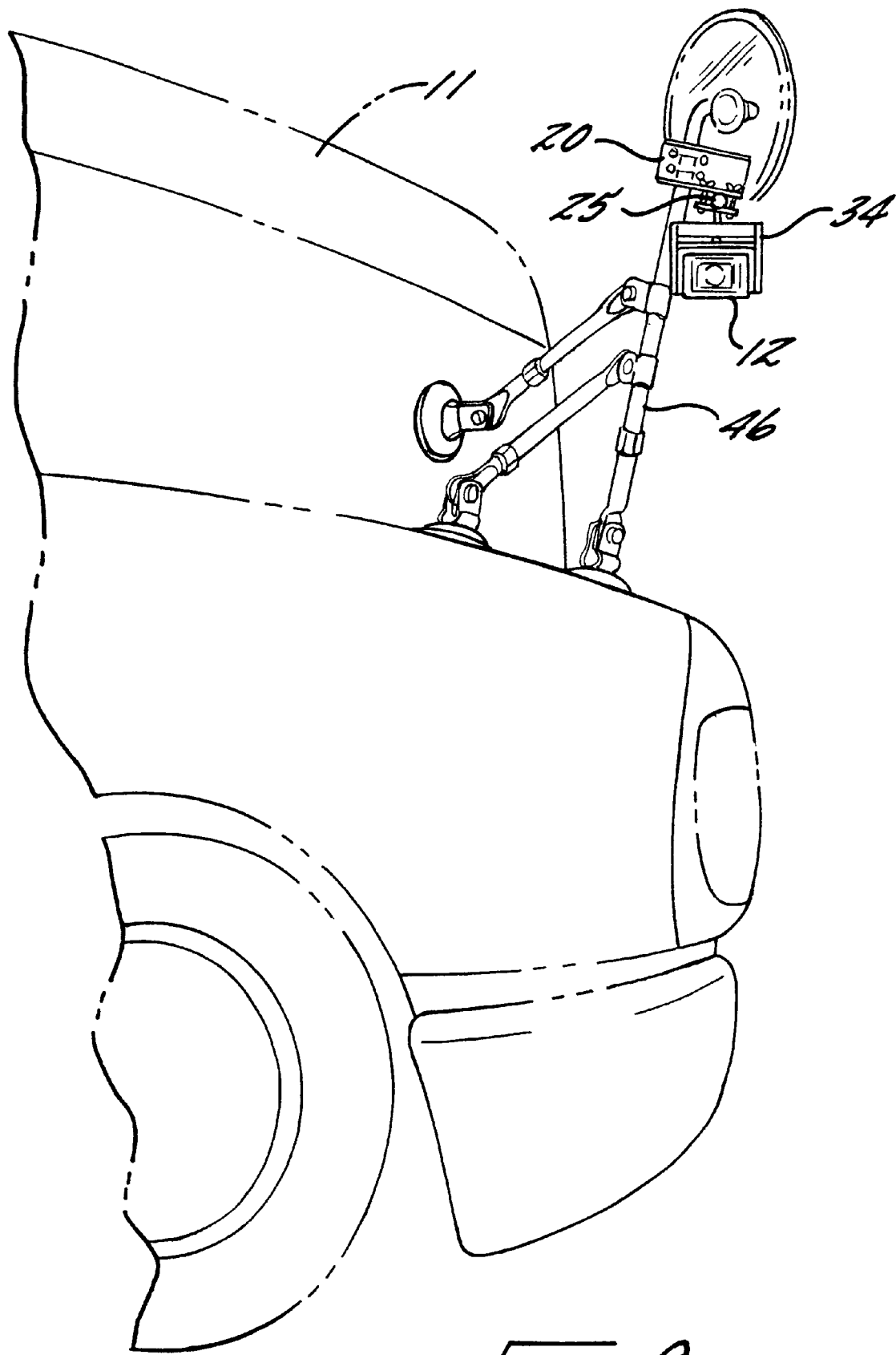
FIG. 9 is a partial perspective view of another preferred embodiment of the invention illustrating the video camera and camera securing means mounted on auxiliary mirror framework positioned on the right front fender of the commercial transport.

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 1 is a top plan environmental view depicting a commercial transport carrier and adjacent vehicles on an interstate illustrates the no-zones.

An overall view of the monitoring system 10 which incorporates features of the present invention is set forth in FIG. 2.

As depicted in FIG. 2, the monitoring system 10 is capable of being retrofitted to a commercial transport carrier 11 and includes a video camera 12, a means for securing the video camera to the transport carrier 11 at a first point of attachment, a monitor 13, a means for securing the monitor in the cab of the transport carrier at a second point of attachment, and a coaxial cable 14 for relaying images from the video camera to the monitor.

With reference to FIG. 2, it will be understood that the term "point of attachment" refers to an external or internal location on the structural frame of the transport carrier 11. It will be further appreciated by those of ordinary skill in the art that, as used herein, the concept of the monitoring system 10 being "retrofitted" or "capable of being retrofitted" refers to new or modified parts being installed in a previously manufactured commercial transport carrier. Similarly, it will be appreciated by those of ordinary skill in the art that, as used herein, the concept of an element being "between" two other elements does not necessarily imply that the elements are contiguous (i.e., in intimate contact). Rather, as used herein, the concept of one element being between two other elements is meant to describe the relative positions of the elements within the invention, respectively.

The video camera 12 is secured to an exterior portion of the commercial transport carrier 11 at a first point of attachment and is capable of presenting a mirror-image view 15 of areas adjacent the transport carrier to include vehicles entering the highway via on ramps. See FIG. 5A. Specifically, the driver is presented with a mirror-image view 15 of the "blind spots" adjacent the transport carrier 11. Preferably, the monitor 13 or video camera 12 includes an operating switch for selecting either a mirror-image or standard view.

Additional advantages of the present invention, and in particular the position of the video camera on the carrier include an expanded view of the rear end of the trailer. A common concern of truckers during hard right turns and U-turns is colliding with street signs and curbs. The positioning of the video camera 12 on either the rear-view mirror framework 43 or auxiliary mirror framework 46 (see FIGS. 2 and 9), coupled with the camera's expanded field of view, provides the driver with an unobstructed view of, for example, a stop sign or curb, during the right-hand turn.

Furthermore, the positioning of the camera having an increased field of view permits a driver to safely conduct blindside backing maneuvers. In particular, when backing a trailer into a loading dock, drivers are oftentimes required to turn the trailer for proper positioning. The present invention alleviates the blind-spot prevalent with conventional rear-view mirrors and, thus, promotes safe docking procedures on loading docks and ramps.

Advantageously, the video monitoring system 10 is capable of being retrofitted to existing commercial transport carriers. For example, the present invention can be retrofitted to an existing commercial transport carrier 11 in approximately two-and-a-half hours, or about the same amount of time it takes to install a citizens band (CB) radio. The video camera 12 is adapted to receive any number of camera lenses according to the driver's preference, thereby facilitating use of the system during a variety of driving conditions (e.g., fog, rain, nighttime). For example, in a preferred embodiment of the present invention, the video camera 12 includes a wide-angle lens that is capable of providing a field of view of between about 87 and 135 degrees. Further the video camera 12 may include a charge coupled device (CCD) sensor for enhancing the images appearing on the monitor 13 during low light conditions and for increasing resolution.

In order to secure the video camera 12 to the transport carrier 11, a means for securing the video camera to the first point of attachment is provided. Illustrated in FIG. 7, the video camera securing means is comprised of a fastening bracket 20, a platform 21 integral to one end of the fastening bracket, and means for attaching the fastening bracket to the first point of attachment on the transport carrier 11. The platform 21 on the fastening bracket 20 provides a mounting position for the video camera 12. See FIGS. 2 and 3.

Accordingly, the fastening bracket 20 secures the mounted video camera 12 to the first point of attachment. In a preferred embodiment, the fastening bracket 20 is substantially rectangular. In the particular device illustrated in FIG. 7, the platform 21 extends laterally from a longitudinal side of the fastening bracket 20. Preferably, the platform 21 extends substantially perpendicular to the geometric plane of the fastening bracket 20. Furthermore, the platform 21 defines a central opening 22 and a plurality of spaced-apart openings 23 positioned adjacent the central opening. A plurality of spaced-apart openings 24 that extend through the fastening bracket 20 is provided at an end of the fastening bracket opposite the platform 21. The spaced-apart openings 24 in the fastening bracket 20 are adapted to receive the attachment means.

As described in the preferred configuration and depicted in FIG. 2, it will be understood that the video camera 12 is adjustably mounted to the first point of attachment by the camera securing means and the monitor 13 is adjustably mounted to the second point of attachment by the monitor securing means.

With reference to FIG. 7, the camera securing means is further comprised of a ball mount 25 and adjustable screw 30 mechanism, a bracket 31 for securing the ball mount, a plurality of positioning screws 32 and correspondingly threaded nuts 33 for connecting the ball mount bracket to the platform 21, and a support bracket 34 (illustrated in FIGS. 2 and 3) for supporting the video camera 12. The ball mount 25 is preferably made of steel or similar metal and includes a threaded opening for receiving one end of the screw 30. Alternatively, the ball mount 25 may be formed from injection-molded plastics or elastomeric compound (e.g., rubber). As discussed below, an opposite end of the screw 30 is connected to the camera support bracket 34 and thus affixes the camera 12 to the fastening bracket 20. See FIG. 3. The ball mount bracket 31 is configured to receive a portion of the ball mount 25 and assist in securing the ball mount mechanism to the fastening bracket 20. Specifically, the ball mount bracket 31 includes a central opening 35 and a plurality of spaced-apart openings 40 that are positioned about the perimeter of the central opening. As depicted in FIG. 7, the central opening 22 and spaced-apart openings 23 of the platform 21 and the central opening 35 and the spaced-apart openings 40 of the ball mount bracket 31 are coaxially aligned. In order to secure the ball mount 25 and screw 30 mechanism—and hence the video camera 12—the positioning screws 32 extend through the corresponding plurality of spaced-apart openings 23 in the platform 21 and the spaced-apart openings 40 in the ball mount bracket 31, and are secured with the nuts 33. In a preferred embodiment, the nuts 33 include nylon thread inserts for reducing vibration.

Thus, the central opening 22 of the platform 21 and the central opening 35 of the ball mount bracket 31 cradle the ball mount 25 and adjustable screw 30 mechanism there between. See FIG. 3. Stated differently, the ball mount 25 is secured between a lower surface of the platform 21 and an upper surface of the ball mount bracket 31. As shown in FIGS. 3 and 7, the adjustable screw 30 extends downwardly through the central opening 35 in the ball mount bracket 31 and connects the camera support bracket 34 to the fastening bracket 20.

The present invention may alternatively include grommets (not shown) positioned in the central opening 22 of the platform 21 and the central opening 35 of the ball mount bracket 31 for reducing vibrational forces resulting from highway travel. In a preferred embodiment, the grommets are formed from an elastomeric compound (e.g., rubber) or similar resilient compound capable of absorbing vibrational forces. The grommets, thus, minimize movement of the camera 12 and provide a stable image for the driver viewing the monitor 13.

In operation, one is able to adjust the positioning of the camera 12—attached to one end of the ball mount 25—by loosening the nuts 33 at one end of the positioning screws 32, and then adjusting the camera to obtain the desired orientation of the camera lens. See FIGS. 3 and 4. In this fashion, rotation of the ball mount 25 between the ball mount bracket 31 and platform 21 promotes movement of the camera 12. Likewise, upon achieving the desired positioning of the camera 12, an operator tightens the nuts 33 and thereby secures the camera in position. Accordingly, the positioning screws 32 and ball mount 25 promote and prevent movement of the ball mount and camera 12.

In geometric terms, the adjustable screw 30 is capable of traveling within an area bounded by the lateral surface of a right circular cone, thereby facilitating the movement of the video camera 12 through three or more planes. See FIGS. 3 and 4.

In accordance with the present invention, the camera securing means provides conical rotation of the screw 30, thus providing alternative positioning of the video camera 12. Therefore, the ball mount 25 mechanism securing the camera 12 to the fastening bracket 20 provides the driver with a selectable field of view of at least 180 degrees. In a preferred embodiment, the camera 12 provides a field of view of between about 87 and 135 degrees.

The present invention is also concerned with attaching the fastening bracket 20 to the transport carrier 11. This is accomplished by providing a means for attaching the fastening bracket which may include a plurality of U-shaped members 41 that have threaded legs and a plurality of correspondingly threaded nuts 42. See FIG. 7. The legs of the U-shaped members 41 are configured to advance through the plurality of spaced-apart openings 24 in the fastening bracket 20. In the preferred embodiment, the point of attachment is a standard rear-view mirror framework 43 of the transport carrier 11. See FIG. 2. The point of attachment may also include the auxiliary mirror framework 46 (e.g., tripod arrangement) (see FIG. 9) provided on the fenders of most commercial transport carriers 11 for mounting convex mirrors, thus providing a view of vehicles adjacent the front wheels and along the sides of the transport carrier 11. Accordingly, upon positioning the legs of the U-shaped members 41 around a portion of the rear-view mirror framework 43 (or auxiliary mirror framework 46) and advancing the legs through the spaced-apart openings 24 in the fastening bracket 20, the nuts 42 are screwed onto the threaded legs, thereby releasably securing the fastening bracket 20 to the first point of attachment (i.e., auxiliary mirror framework) on the transport carrier 11.

In an alternative embodiment the attachment means includes a plurality of straps (not shown) and a plurality of clamps (not shown) for securing the fastening bracket 20 to the first point of attachment on the transport carrier 11. The point of attachment in this alternative embodiment is likewise the standard rear-view mirror framework 43 or auxiliary mirror framework 46 of the transport carrier 11. The straps are preferably elastic in nature, yet of sufficient strength to support the weight of the camera and camera securing means. The straps may be formed from rubber or knitted fibers having elastic qualities. During retrofit of the present invention, the fastening bracket 20 is positioned adjacent, for example, the rear-view mirror framework 43 and one end of the straps is advanced through one of the spaced-apart openings 24 in the bracket. Next, the strap is wrapped around a portion of the rear-view mirror framework 43 and advanced through an adjacent spaced-apart opening 24 in the bracket 20. Finally, clamps positioned at another end of the strap secure the ends of the strap together, thereby securing the camera support bracket 34 to the rear-view mirror framework 43 or auxiliary mirror framework 46.

In yet another embodiment, the attachment means may include a plate (not shown) and a plurality of screws and correspondingly threaded nuts (not shown) for connecting the plate to the fastening bracket 20. The plate includes a plurality of spaced-apart openings positioned in corresponding relationship with the plurality of spaced-apart openings 24 in the fastening bracket 20. In this alternative embodiment, the first point of attachment is preferably a fender or side running board of the commercial transport carrier 11. In order to secure the fastening bracket 20 to the commercial transport carrier 11, the plate and fastening bracket 20 are positioned on opposite sides of the point of attachment (e.g., fender), and the screws are advanced through the spaced-apart openings in the plate and the spaced-apart openings 24 in fastening bracket 20. Finally, the nuts are secured to the ends of the screws, thus securing the camera support bracket 34 to the transport carrier 11.

In still another embodiment, the attachment means may include a two-sided adhesive pad (not shown) of sufficient bonding strength to secure the fastening bracket 20 to the first point of attachment.

Yet another embodiment of the invention includes attachment means comprised of a suction cup and lever device (not shown) for securing the fastening bracket 20 to the first point of attachment.

Turning to FIG. 5, the monitor 13 is secured to an interior portion of the transport carrier 11 (i.e., cab) at a second point of attachment by the monitor securing means. The monitor 13 is positioned adjacent the driver, such that the driver is able to view the mirror-image display 15 of blind spots generated by the video camera 12. See FIG. 5A. The ability of the monitor to display the mirror-image of the no-zones is preferred due to practical concerns. Briefly, drivers are typically conditioned to respond to mirror-images of traffic to the sides and rear of vehicles because of the physical properties of standard mirrors. In a preferred embodiment, the second point of attachment for the monitor 13 is the dashboard 44 of the transport carrier 11. See FIG. 5. Alternatively, the monitor 13 may be affixed to the interior roof or console of the cab. In the preferred embodiment, the monitor 13 is a liquid crystal display (LCD) having a thin film transistor for increasing the operating speed of the monitor. Advances in LCD technology permit current monitors to withstand the rigors of highway travel. The monitor 13 may also include an adjustable or fixed environmental hood 45 that is connected to an upper portion of the monitor. The hood 45 promotes viewing of the monitor 13 when exposed to bright conditions (e.g., at sunrise and sunset) by preventing direct sunlight from obscuring the image displayed. Furthermore, when the monitor is mounted on the interior roof, the hood 45 prevents light emitted by the dashboard lighting (e.g., dials and speedometer) from obscuring the image on the monitor 13, especially during night hours.

Referring to FIGS. 6 and 8, the monitor securing means is comprised of a monitor support bracket 50 and a means for attaching the monitor support bracket to the second point of attachment. As depicted in FIG. 8, the monitor support bracket 50 includes a first leg 51 and a second leg 52. The first leg 51 of the monitor support bracket 50 includes a plurality of spaced-apart openings 53 that extend through the bracket for receiving the attachment means. The second leg 52 of the monitor support bracket 50 defines a central opening 54 and a plurality of spaced-apart openings 55 positioned adjacent the central opening 54. The first and second legs 51, 52 of the preferred embodiment are positioned substantially perpendicular to one another.

The attachment means associated with the preferred embodiments of the monitor securing means is comprised of a plurality of mounting screws 60 for securing the monitor support bracket 50 to the second point of attachment. See FIG. 6. The second point of attachment may include the dashboard 44 or interior roof section of the cab. Alternatively, the monitor securing means may include high-strength, double-sided adhesive pads (not shown).

The monitoring system 10 further provides a coaxial cable 14 for relaying images from the video camera 12 to the monitor 13. In the most preferred embodiment, the coaxial cable 14 is routed from the camera 12, along the framework supporting the rear-view mirror framework 43 or auxiliary mirror framework 46, through an opening in the door of the cab, and to the monitor 13. The cable 14 can be affixed to the vehicle structure by common cable clamps.

Referring to FIG. 8, the monitor securing means is further comprised of a ball mount 61 and adjustable screw 62 mechanism, a bracket 66 for securing the ball mount, and a plurality of positioning screws 63 and correspondingly threaded nuts 64 (see FIG. 6) for connecting the ball mount bracket 66 to the second leg 52 of the monitor support bracket 50. In a fashion similar to the securing of the ball mount 25 mechanism associated with the camera 12, the ball mount bracket 66 includes a central opening 65 and a plurality of spaced-apart openings 70 positioned adjacent the central opening 65.

As illustrated in FIG. 8, the central opening 54 and spaced-apart openings 55 of the second leg 52 and the central opening 65 and spaced-apart openings 70 of ball mount bracket 66 are coaxially aligned. As configured in the preferred embodiment, the central opening 54 in the second leg 52 and the central opening 65 in the ball mount bracket 66 cradle the ball mount 61 there between. See FIG. 6.

The present invention may alternatively include grommets (not shown) positioned in the central opening 54 of the second leg 52 and the central opening 65 of the ball mount bracket 66 for reducing vibrational forces affecting the monitor as a result of highway travel. In a preferred embodiment, the grommets are formed from elastomeric compound (e.g., rubber) or similar resilient compound that is capable of absorbing vibrational forces. The grommets, thus, minimize movement of the monitor 13 and provide a stable image for the driver.

Accordingly, the ball mount 61 associated with the monitor 13 is adjustably secured between a upper surface of the ball mount bracket 66 and a lower surface of the second leg 52. As depicted in FIG. 8, the adjustable screw 62 extends upwardly through the central opening 54 of the monitor support bracket 50 and connects to the monitor 13. Upon installation, the positioning screws 63 pass through the corresponding plurality of spaced-apart openings 70 in the ball mount bracket 66 and the spaced-apart openings 55 of the monitor support bracket 50. Thus, the loosening of the nuts 64 promotes the movement of the ball mount 61 and ball mount bracket 66, thereby facilitating movement of the monitor 13. Alternatively, the tightening of the nuts 64 secures the monitor 13 in a desired position.

Likewise, the adjustable screw 62 of the ball mount 61 mechanism associated with the monitor 13 is capable of traveling within an area bounded by the lateral surface of a right circular cone, thereby promoting movement of the monitor 13 through three or more planes. This movement, accordingly, provides the driver with adjustable viewing of the mirror-image view 15 provided by the video camera 12, as depicted in FIG. 5A.

The monitoring system 10 of the present invention may also include a cigarette lighter adapter 71 that connects to the monitor 13 and provides power from the commercial transport carrier 11 to the monitor 13 and camera 12. See FIG. 5. The cigarette lighter adapter 71 includes a cord 72 and plugs 73, 74. See FIGS. 5 and 6. One plug 73 of the adapter 71 is inserted into the cigarette lighter of the transport carrier 11 and the other plug 74 at an opposite end is connected to the monitor 13. This feature of the present invention eliminates the need for a separate power unit and further expedites the retrofitting procedure. As an alternative to the cigarette lighter adapter 71, if the internal portion of the cab is fitted with connection posts (not shown) that provide power from the battery of the transport carrier 11, the monitor 13 is adaptable to accept a cable extending from the post for powering the monitor and camera 12.

In the drawings and specification, there have been disclosed typical embodiments on the invention and, although specific terms have been employed, they have been used in a generic and descriptive sense only and not for purposes of limitation, the scope of the invention being set forth in the following claims.

That which is claimed is:

1. A vehicular safety monitoring system for use in conjunction with commercial transport carriers, said system comprising:

a video camera scoured to an exterior portion of a commercial transport carrier at a first point of attachment, said video camera capable of presenting a mirror-image of areas adjacent the transport carrier;

means for securing said video camera to the first point of attachment, said video camera securing means comprising a substantially rectangular fastening bracket for securing said video camera to the first point of attachment on the transport carrier, a platform integrally formed at one end of said fastening bracket for mounting said video camera to the transport carrier, said platform extending laterally from a longitudinal side of said fastening bracket, a ball mount and adjustable screw mechanism, a bracket for receiving said ball mount and adjustable screw mechanism, said ball mount bracket, defining a central opening and a plurality of spaced-apart openings positioned adjacent said central opening, a plurality of positioning screws and correspondingly threaded nuts for connecting said ball mount bracket to said platform of said fastening bracket, and a support bracket for supporting said video camera, said video camera support bracket connected to said adjustable screw;

means for attaching said fastening bracket to the first point of attachment on the transport carrier, said attachment means comprising a plurality of U-shaped members having threaded legs for releasably securing said fastening bracket to the first point of attachment on the transport carrier; said legs capable advancing through said plurality of spaced-apart openings in said fastening bracket, and a plurality of nuts for engaging said legs upon said legs advancing through said plurality spaced-apart openings in said fastening bracket;

a monitor secured to an interior portion of the transport carrier at a second point of attachment, said monitor positioned adjacent a driver and capable of displaying the minor-image view generated by said video camera;

means for securing said monitor to me second point of attachment; and a coaxial cable for providing power from the transport carrier to said video camera and relaying images from said video camera to said monitor;

wherein said video camera is adjustably mounted to the first point of attachment by said video camera securing means and said monitor is adjustably mounted to the second point of attachment by said monitor securing means;

wherein said monitoring system is capable of being retrofitted to existing commercial transport carriers;

wherein an end of said fastening bracket opposite said platform defines a plurality of spaced-apart openings, said openings extending through said fastening bracket and adapted to receive said attachment means;

wherein said platform defines a central opening and a plurality of spaced-apart openings positioned adjacent said central opening;

wherein said central opening and said spaced-apart openings of said platform, and said central opening and said spaced-apart openings of said ball mount bracket are coaxially aligned, such that said central opening of said platform and said central opening of said ball mount bracket cradle said ball mount and adjustable screw mechanism there between.

2. A monitoring system according to claim 1, further comprising a cigarette lighter adapter connected to said monitor for providing power from the commercial transport carrier to said monitor and said video camera.

3. A monitoring system according to claim 1, wherein said video camera includes:

a wide-angle lens for providing a field of view of between about 87 and 135 degrees; and a charge coupled device sensor.

4. A monitoring systems according to claim 1, wherein said video camera securing means is capable of conical rotation, thereby providing alternative positioning of said video camera within an area bounded by the lateral surface of a right circular cone, thereby providing the driver with a selectable field of view of at least 180 degrees.

5. A monitoring system according to claim 1, wherein said platform extends substantially perpendicular to the geometric plane of said fastening bracket.

6. A monitoring system according to claim 1, wherein the first point of attachment is a standard rear-view mirror framework of the transport carrier.

7. A monitoring system according to claim 1, wherein the first point of attachment is an auxiliary mirror framework of the transport carrier.

8. A monitoring system according to claim 1, wherein said video camera securing means further comprises:

a pair of grommets positioned in said central opening of said platform and said central opening of said ball mount bracket;

wherein said grommets cushion said ball mount and minimize vibrational forces acting on said video camera connected to said ball mount and adjustable screw mechanism.

9. A monitoring system according to claim 8, wherein said pair of grommets are formed of a resilient compound.

10. A monitoring system according to claim 1, wherein:
said ball mount is adjustably secured between a lower surface of said platform and an upper surface of said ball mount bracket by manipulation of said positioning screws passing through said corresponding plurality of spaced-apart openings in said platform and said ball mount bracket to thereby promote or prevent movement of said ball mount, such that said adjustable screw extends through said central opening of said ball mount bracket and connects said video camera support bracket to said fastening bracket.

11. A monitoring system according to claim 10 wherein:
said adjustable screw is capable of traveling within an area bounded by the lateral surface of a right circular cone, thereby facilitating the movement of said video camera through three or more planes.

12. A monitoring system according to claim 1, wherein said monitor securing means comprises:
a support bracket having first and second legs for securing said monitor to the second point of attachment of the transport carrier; and
means for attaching said monitor support bracket to the second point of attachment;
wherein said first leg of said monitor support bracket defines a plurality of spaced-apart openings, said openings extending through said monitor support bracket and adapted to receive said attachment means;
wherein said second leg of said monitor support bracket defines a central opening and a plurality of spaced-apart openings positioned adjacent said central opening.

13. A monitoring system according to claim 12, wherein said first and second legs are positioned substantially perpendicular to one another.

14. A monitoring system according to claim 12, wherein said attachment means comprises:
a plurality of mounting screws for releasably securing said monitor support bracket to the second point of attachment.

15. A monitoring system according to claim 14, wherein the second point of attachment is a dashboard in the cab of the transport carrier.

16. A monitoring system according to claim 14, wherein the second point of attachment is an internal roof portion of the transport carrier.

17. A monitoring system according to claim 12, wherein said monitor securing means further comprises:
a ball mount and adjustable screw mechanism;
a bracket for receiving said ball mount and adjustable screw mechanism, said ball mount bracket defining a central opening and a plurality of spaced-apart openings positioned adjacent said central opening; and
a plurality of positioning screws and correspondingly threaded nuts for connecting said ball mount bracket to said second leg of said monitor support bracket;
wherein said central opening and said spaced-apart openings of said second leg and said central opening and said spaced-apart openings of said ball mount bracket are coaxially aligned, such that said central opening of said second leg end said central opening of said ball mount bracket cradle said ball mount and adjustable screw mechanism there between.

18. A monitoring system according to claim 17, wherein said monitor securing means further comprises:
a pair of grommets positioned in said central opening of said second leg and said central opening of said ball mount bracket;
wherein said grommets cushion said ball mount and minimize vibrational forces acting on said monitor connected to said ball mount.

19. A monitoring system according to claim 18, wherein said pair of grommets are formed of a resilient compound.

20. A monitoring system according to claim 17, wherein:
said ball mount is adjustably secured between a lower surface of said second leg and an upper surface of said monitor support bracket by manipulation of said positioning screws passing through said corresponding plurality of spaced-apart openings in said second leg and said ball mount bracket to thereby promote or prevent movement of said ball mount, such that said adjustable screw extends through said central opening of said ball mount bracket and connects said monitor to said monitor support bracket.

21. A monitoring system according to claim 20, wherein:
said adjustable screw is capable of traveling within an area bounded by the lateral surface of a right circular cone, thereby facilitating the movement of said monitor through three or more planes, thereby providing the driver with adjustable viewing of said mirror-image view generated by said video camera.

22. A monitoring system according to claim 1, wherein said monitor is a liquid crystal display having a thin film transistor.

23. A monitoring system according to claim 1, wherein said monitor includes an adjustable hood for promoting the viewing of said monitor during daylight.

24. A vehicular safety monitoring system for use in conjunction with commercial transport carriers, said system comprising:
a video camera having a wide-angle lens providing a field of view of between about 87 and 135 degrees that is retrofitted to an exterior portion of a commercial transport carrier at a first point of attachment, said video camera having a charge coupled device and capable of generating a mirror-image of areas adjacent the transport carrier;
a fastening bracket having a mounting platform integrally formed at one end for retrofitting said video camera to the first point of attachment on the transport carrier, said platform defining a central opening and a plurality of spaced-apart openings positioned adjacent said central opening;
a resilient grommet positioned in said central opening of said platform for minimizing vibrational forces acting on said video camera upon construction of said monitoring system;
a liquid crystal display monitor having a thin film transistor that is retrofitted to an interior portion of the transport carrier at a second point of attachment, said monitor positioned adjacent a driver and capable of displaying the mirror-image view generated by said video camera;
a support bracket having first and second legs for retrofitting said monitor to the second point of attachment, said first leg defining a plurality of spaced-apart openings that extend through said monitor support bracket, said second leg defining a central opening and a plurality of spaced-apart openings positioned adjacent said central opening;

a coaxial cable retrofitted to the transport carrier for providing power from the transport carrier to said video camera and for relaying images from said video camera to said monitor;

a cigarette lighter adapter connected to said monitor for providing power from the commercial transport carrier to said monitor and said video camera;

a first ball mount and screw mechanism for adjustably securing said video camera to said fastening bracket;

a second ball mount and screw mechanism for adjustably securing said monitor to said monitor support bracket; and means for attaching said fastening bracket to the first point of attachment on the transport carrier;

wherein said platform extends laterally from and substantially perpendicular to a longitudinal side of said fastening bracket;

wherein said first and second legs are positioned substantially perpendicular to one another;

wherein said first and second ball mount mechanisms selectively promote the pivotal rotation of said video camera and said monitor, respectively, through three or more planes.

25. A monitoring system according to claim 24, wherein said first ball mount and screw mechanism comprises:

a bracket for securing said first ball mount and screw mechanism to said platform, said first ball mount bracket defining a central opening and a plurality of spaced-apart openings positioned adjacent said central opening;

a resilient grommet positioned in said central opening of said first ball mount bracket for minimizing vibrational forces acting on said video camera upon construction of said monitoring system;

a plurality of positioning screws and correspondingly threaded nuts for connecting said first ball mount bracket to said platform of said fastening bracket; and a bracket for supporting said video camera, said video camera support bracket connecting said first ball mount and screw mechanism and said camera;

wherein said central opening and said spaced-apart openings of said platform and said central opening and said spaced-apart openings of said first ball mount bracket are coaxially aligned, such that said central opening of said platform and said central opening of said first ball mount bracket cradle said first ball mount and screw mechanism there between;

wherein the manipulation of said positioning screws and nuts selectively promote or prevent the movement of said first ball mount and screw mechanism, thereby promoting or preventing the movement of said video camera.

26. A monitoring system according to claim 24, wherein said attachment means comprises:

at least two U-shaped members having threaded legs for releasably securing said fastening bracket to the first point of attachment on the transport carrier, said legs corresponding with said plurality of spaced-apart openings in said fastening bracket; and at least four nuts for engaging said legs upon passage of said legs through said plurality of spaced-apart openings in said fastening bracket.

27. A monitoring system according to claim 26, wherein the first point of attachment is a standard rear-view mirror framework of the transport carrier.

28. A monitoring system according to claim 26, wherein the first point of attachment is an auxiliary mirror framework of to transport carrier.

29. A monitoring system according to claim 24, wherein said monitor support bracket comprises:

a plurality of mounting screws for releasably securing said monitor support bracket to the second point of attachment; and a resilient grommet positioned in said central opening of said second leg for minimizing vibrational forces acting on said monitor upon construction of said monitoring system;

wherein said plurality of spaced-apart openings in said first leg extend through said monitor support bracket for receiving said mounting screws.

30. A monitoring system according claim 24, wherein said second ball mount and screw mechanism comprises:

a bracket for securing said second ball mount and screw mechanism to said second leg of said monitor support bracket, said second ball mount bracket defining a central opening and a plurality of spaced-apart openings positioned adjacent said central opening;

a resilient grommet positioned in said central opening of said second ball mount bracket for minimizing vibrational forces acting on said monitor upon construction of said monitoring system; and a plurality of positioning screws and correspondingly threaded nuts for connecting said second ball mount bracket to said second leg of said monitor support bracket;

wherein said central opening and said spaced-apart openings of said second leg and said central opening and said spaced-apart openings of said second ball mount bracket are coaxially aligned, such that said central opening of said second leg and said central opening of said second ball mount bracket cradle said second ball mount and screw mechanism there between;

wherein the manipulation of said positioning screws and nuts selectively promote or prevent the movement of said second ball mount and screw mechanism, thereby promoting or preventing the movement of said monitor.

* * * * *

UNITED STATES PATENT AND TRADEMARK OFFICE
CERTIFICATE OF CORRECTION

PATENT NO. : 6,693,519 B2
DATED : February 17, 2004
INVENTOR(S) : Robert Lewis Keirstead It is certified that error appears in the above-identified patent and that said Letters Patent is hereby corrected as shown below:

Column 9,
Line 37, "scoured" should read -- secured --.

Column 10,
Line 10, "minor-image" should read -- mirror-image --.
Line 11, "me" should read -- the --.

Column 11,
Line 67, "end" should read -- and --.

Column 14,
Line 16, "to" should read -- the --.

Signed and Sealed this

First Day of June, 2004

JON W. DUDAS
*Acting Director of the United States Patent and Trademark Office*